Sept. 30, 1930. C. L. SNYDER 1,776,935
SHIPPING DEVICE
Filed Jan. 5, 1929

INVENTOR
CLIFFORD L. SNYDER.
BY
Harness, Dickey & Pierce
ATTORNEYS

Patented Sept. 30, 1930

1,776,935

UNITED STATES PATENT OFFICE

CLIFFORD L. SNYDER, OF DETROIT, MICHIGAN, ASSIGNOR TO THE EVANS AUTO LOADING CO. INC., A CORPORATION OF DELAWARE

SHIPPING DEVICE

Application filed January 5, 1929. Serial No. 330,503.

This invention relates to shipping devices such as are more particularly intended or adapted for use in the shipping of motor vehicles in freight cars. In the shipment of automobiles in freight cars it is necessary to provide some means for preventing forward and backward movement of the automobile in the freight car as well as means for preventing vertical movement of the automobile relative to the freight car floor. A common expedient is to utilize chocks which are nailed to the car floor and which bear against each side of each wheel for preventing longitudinal movements of the motor vehicle, and holddowns which are secured at one end to a part of the vehicle chassis and at the other end to the freight car floor for preventing vertical movement of the vehicle. This method requires the use of nails, screws or the like for securing the hold-downs and chocks to the freight car floor and after the devices have been secured and removed from a freight car floor several times, it becomes necessary to refloor the car.

It has been proposed to provide the freight car floors with slots of generally T shaped formation through which the hold-downs and chocks are secured to the floor without the use of nails, screws or the like. My invention contemplates the provision of a unique type of chock for use in a system of this general character, which chock will be simple and economical to manufacture and may be readily adjusted for varying sizes of tires which may be used on various makes of motor vehicles.

With the above and other objects in view, my invention consists in the arrangement, combination and construction of the various parts of my improved device as described in the specification, claimed in my claims and shown in the accompanying drawings, in which:

Figure 1:
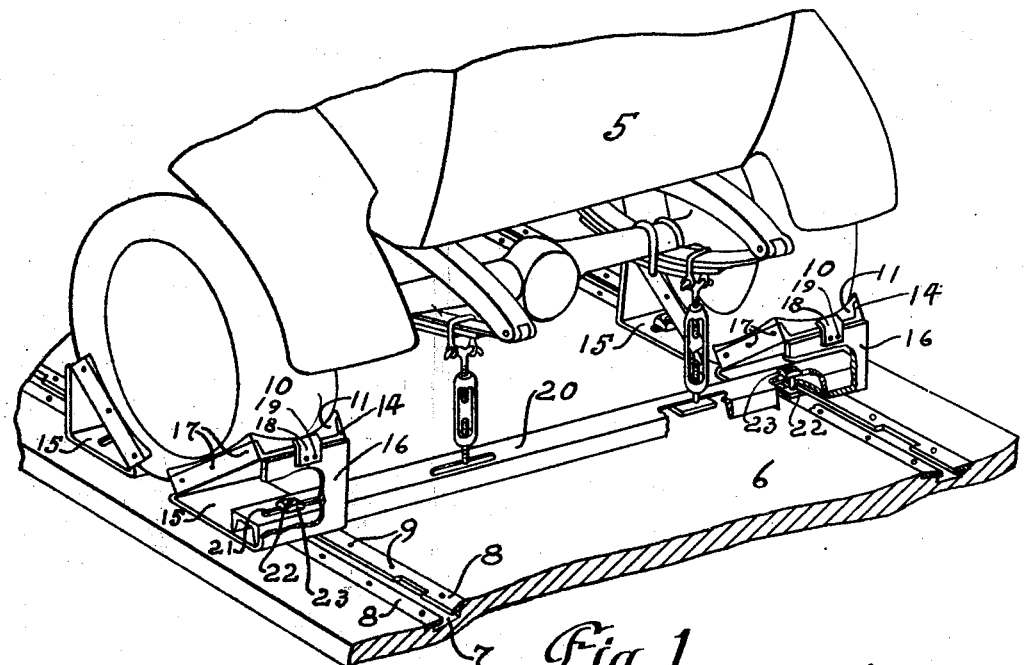
Fig. 1 is a perspective view of the rear end of a motor vehicle secured to the floor of a freight car in accordance with my invention, certain parts being broken away to better illustrate the invention.
Figure 2:
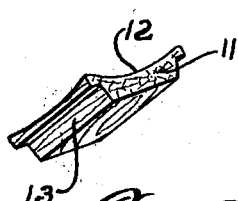
Fig. 2 is a perspective view of an insertable piece which is used in the wheel chocks for the purpose of accommodating different sizes of wheel tires.

I have shown a motor vehicle which is generally indicated as 5 and which is to be mounted in a freight car having a floor 6. The floor 6 may be provided with grooves or slots 7, on each side of which are provided plates 8, the same being permanently secured in place by screws 9 or the like. The plates 8 are disposed so as to provide a space between their closest edges, the said edges overlapping the edges of the slot 7 so as to form in effect an inverted T slot.

The wheels 10 of the motor vehicle lie over the spaced T slots above described and chocks are positioned on each side of each wheel to prevent the wheels from rolling or otherwise moving longitudinally of the freight car. These chocks comprise wooden pieces indicated generally as 11, each having a curved face 12 which is adapted to bear against the tire of the vehicle and an angular rearward portion 13, which is adapted to be seated in a correspondingly shaped portion 14 formed in a metallic portion of the chock. The said metallic portion, in the form here illustrated, comprises a single piece of material having a base 15, a vertically extending portion 16 and the portion 14 which receives the tire engaging member 11.

As will be readily seen from the drawings, the portion 14 comprises a diagonally extending part which forms a continuation of the base 15 and which may rest at its top against the top of the vertically extending part 16 so as to form a triangular member admirably adapted to withstand the shocks from the wheel which tend to move the vehicle fore and aft in the freight car. The side flanges which are formed on the portion 14 prevent the dislocation of the tire engaging portion 11 and may be provided with holes through which the tire engaging portion may be secured to the metallic portion by means of nails, screws or the like as at 17.

Furthermore, a lug 18 may be secured to the vertical portion 16 in any suitable manner, such as rivets 19, which lug extends above the top of the portion 16 and serves as a backing for both the tire engaging portion 11 and the portion 14 of the metallic member.

In order to secure the chocks to the freight car floor, I provide a channel member 20 which extends from one slot 7 to the other, passing over the base 15 of the triangular portion of the chock and beneath the portion 14 thereof. Elongated slots 21 adjacent each end of the channel member 20 through which bolts 22 extend are provided. The bolts 22 may have suitable heads on the bottoms thereof which engage in the slots 7 and may also have nuts 23 secured on the top thereof against the top of the channel member 20 so as to secure the channel member and the chocks firmly to the floor of the car.

Figure 4:
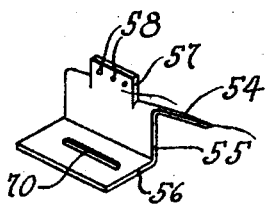
Fig. 4 is a perspective view of a modified form of securing member for the member shown in Fig. 3.
Figure 3:
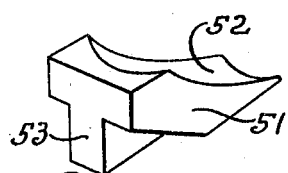
Fig. 3 is a perspective view of a modified form of wheel engaging member.

In Figs. 3 and 4 I have shown a modified form of my invention. In Fig. 3 I have shown a wheel engaging member 51 having a surface 52 which receives the wheel and a rearward angular extension 53, which is received between the legs 54 of the securing device shown in Fig. 4. Said latter device comprises, in addition to legs 54, the vertical central portion 55 and base portion 56. The base portion 56 has a slot 70 therein through which the bolt 22 may pass for securing the member to the floor. An upstanding portion 57 extends above the top of legs 54 and serves as a backing for the top portion of the member 51. It may be secured to that portion through holes 58.

As is indicated in Fig. 1 of the drawings, suitable hold-downs may be secured to the channel member 20 and to the motor vehicle for securing the vehicle against vertical movement relative to the freight car floor, but that particular construction forms the subject matter of another patent application and it is not my intention to herein claim the same. I do not, therefore, here describe it in detail.

It will be readily apparent that the members 11 of the chock devices may be made of wood or any other suitable material. I have identified them as having been made of wood because such material lends itself to shaping and securing in place, but such material is by no means essential to the successful operation of my device.

When manufacturing shipping devices of this character the rearward portion 13 of the members 11 may be made of uniform size and contour so as to fit the portions 14 of the triangular members to which they are assembled, but the curved portions 12 may be varied in size so as to fit different sizes of tires such as may be used on different vehicles. It thus becomes possible to make uniform or standard the entire structure of the chock with the exception of the tire engaging portion, which portion may be carried in varying sizes.

I desire it to be understood that I have herein illustrated but one form of my invention and that various other forms thereof may be employed without departing from the spirit of my invention.

What I claim is:

1. A chock for bracing the wheels of a vehicle comprising a wheel engaging member and a separate member removably attached to the first said member, having means thereon by which it may be secured to a supporting surface, said second member comprising a hollow member having one face engaged with the first member.

2. A chock for bracing the wheels of a vehicle comprising a wheel engaging member and a separate member removably attached to the first said member, having means thereon by which it may be secured to a supporting surface, said second member comprising a hollow triangular member having one face engaged with its support and another with said first member.

3. A chock for bracing the wheels of a vehicle comprising a wheel engaging member and a separate member removably attached to the first said member, having means thereon by which it may be secured to a supporting surface, said second member comprising a single strip of metal bent to triangle shape.

4. A chock for bracing the wheels of a vehicle comprising a wheel engaging member and a separate member removably attached to the first said member, having means thereon by which it may be secured to a supporting surface, said second member comprising a hollow triangular member having one face engaged with its support and another with said first member, said first face carrying the said securing means.

5. A chock for bracing the wheels of a vehicle comprising a wheel engaging member and a separate member removably attached to the first said member, having means thereon by which it may be secured to a supporting surface, said second member comprising a single strip of metal bent to triangle shape and having its free ends abutting.

6. A chock for bracing the wheels of a vehicle comprising a wheel engaging member and a separate member removably attached to the first said member, having means thereon by which it may be secured to a supporting surface, said second member comprising a hollow triangular member having one face engaged with its support and another with said first member, said latter face having flanges formed thereon for engagement with said first member.

7. A chock for bracing the wheels of a vehicle comprising a wheel engaging member and a separate member removably attached to the first said member, having means thereon by which it may be secured to a supporting surface, said second member comprising a single strip of metal bent to triangle shape, one side of said triangle having flanges formed thereon for engagement with said first member.

8. In combination, a pair of spaced hollow members positioned adjacent a pair of wheels and carrying wheel engaging portions, a member extended between and into said first members and common means for securing each of said first members and the adjoining end of said second member to a supporting surface.

9. A chock comprising a wheel engaging member and a member adapted to be secured to a supporting surface, said second member having channel portion receiving one side of the first member.

10. A chock comprising a wheel engaging member and a member adapted to be secured to a supporting surface, said second member having channel portion receiving one side of the first member and an abutment at one end of the channel.

11. A chock for bracing the wheels of a vehicle comprising a wheel engaging member and a separate member removably attached to the first said member, having means thereon by which it may be secured to a supporting surface, said members having interfitting surfaces permitting free removal of the wheel engaging portion from the separate member in one direction and acting as a stop in another direction.

12. A chock for bracing the wheels of a vehicle comprising a wheel engaging member and a separate member removably attached to the first said member, having means thereon by which it may be secured to a supporting surface, one of said members having an angular portion fitting into a similarly shaped portion on the other member.

13. A chock comprising a wheel engaging member and a member to be secured to a support, one of said members being provided with a pair of spaced projections in which a portion of the first member is nested to prevent dislocation of the first member.

14. A chock comprising a wheel engaging member adapted to rest on a support, and a bracing member adapted to be secured to said support, said members having interengaging parts.

15. A chock comprising a wheel engaging member adapted to rest on a support and a bracing member adapted to be secured to said support, one of said members being provided with a pair of spaced projections and the other with a projection closely nesting between the first said projections.

CLIFFORD L. SNYDER.